Nov. 6, 1923.
S. ALSOP
FILTER
Filed Jan. 7, 1922
1,472,896
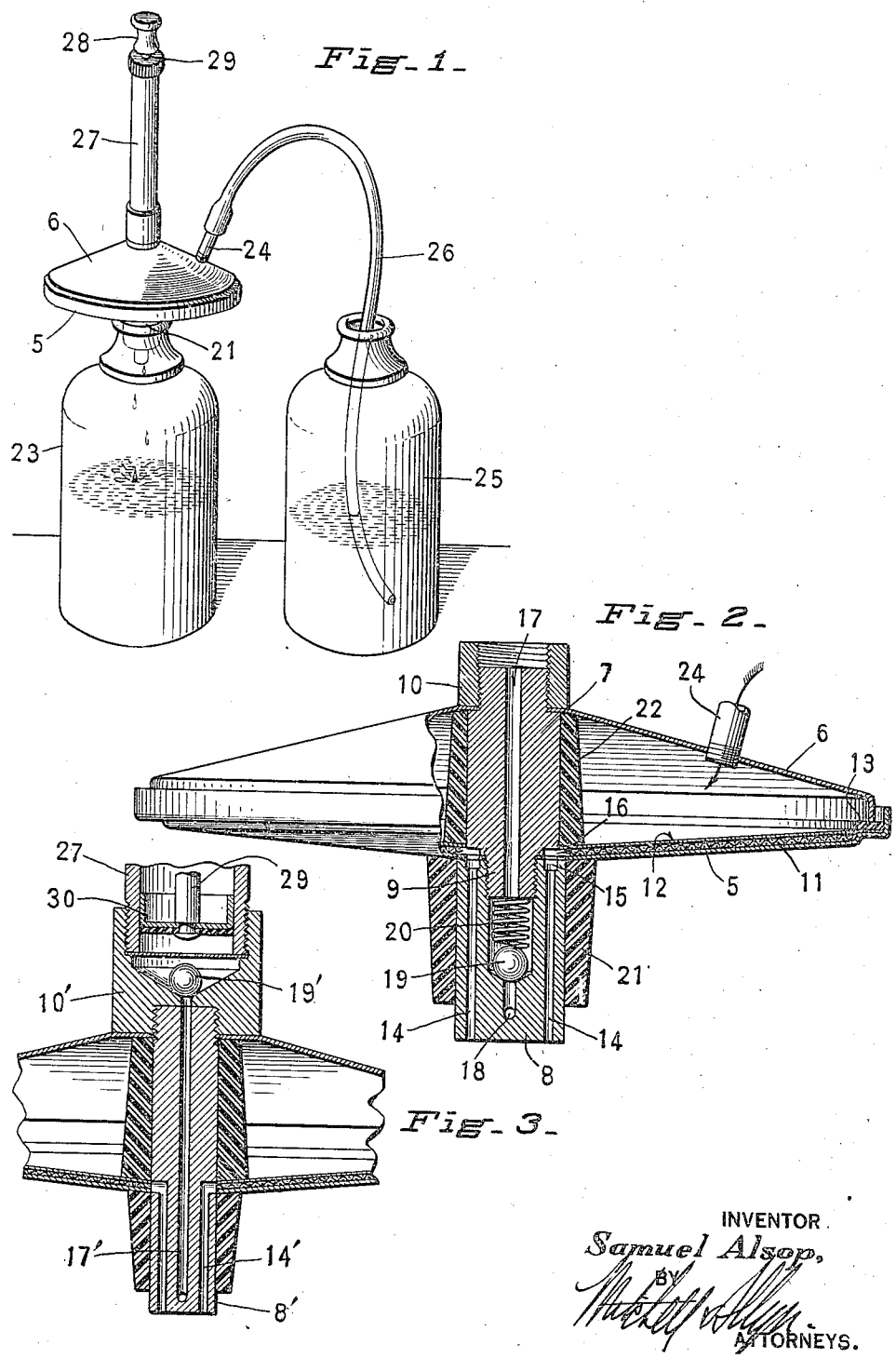
INVENTOR
Samuel Alsop,
BY
ATTORNEYS.

Patented Nov. 6, 1923.

1,472,896

UNITED STATES PATENT OFFICE.

SAMUEL ALSOP, OF NEW YORK, N. Y.

FILTER.

Application filed January 7, 1922. Serial No. 527,663.

*To all whom it may concern:*

Be it known that I, SAMUEL ALSOP, a citizen of the United States of America, residing at New York city, New York County, N. Y., have invented a new and useful Filter, of which the following is a specification.

My invention relates particularly to a construction of a portable or laboratory type. The main object is to provide a simple, inexpensive but effective construction which can be used to rapidly filter a liquid into a receptacle, such as a bottle or jug. Another object is to provide a construction which may conveniently be used to rapidly transfer a liquid from one receptacle to another, and at the same time filter it. Another object is to so construct and arrange the parts that they may readily be assembled or separated for the purpose of cleaning.

In its preferred form, the invention contemplates the use of a casing formed in two parts for receiving and holding the filtering medium. This casing is provided with a central shaft or spindle adapted to be inserted in the neck of a bottle, jug, or cask, and to thus support the parts. This spindle is provided with an air outlet and a liquid inlet with the air outlet on a higher level than the liquid inlet so that air may be withdrawn from the bottle or other receptacle and replaced with liquid which has passed through the filtering chamber. The central spindle member is preferably formed in two parts with a valve in one part to seal the air outlet against atmospheric pressure.

Fig. 1 is a perspective view showing one form of apparatus embodying the improvements of my invention.

Fig. 2 is a sectional view and side elevation of the principal novel parts of my invention.

Fig. 3 is a sectional view showing a modification.

The filter casing has a lower part 5 and an upper part 6. The lower part is preferably somewhat dished or inclined downward toward the center. The central spindle consists of the parts 7 and 8 which are preferably connected together by screw threaded portions, such for instance as the extension 9 screwing into the part 8. The lower part of the casing is preferably clamped between the parts 7 and 8. The upper part of the casing is preferably held in place by a collar 10 screwed on to the upper end of the part 7. The filtering is accomplished by means of a gauze 11 and a filter paper 12, the gauze resting in the bottom of the casing surrounding the central spindle and the outer edge of the filter paper being clamped between the parts of the casing. Preferably, a rubber or cork gasket 13 is employed to ensure a tight peripheral joint. The outer rim of the filter paper is preferably clamped between this gasket 13 and the lower part of the casing. The liquid from the casing passes down through one or more holes 14. In order to ensure proper drainage from the casing, I prefer to provide an annular channel 15 in the upper end of the spindle part 8 so that in screwing the two parts of the spindle together the entrance to the hole 14 will not be stopped up. The lower end of the spindle part 7 may be grooved at 16 to ensure clearance. The air is withdrawn in some suitable manner through a central passage 17, the lower end of which is above the lower end of the liquid opening 14. A valve 19 is provided for this passage 17 and a spring 20 may be employed to hold it yieldingly against its seat.

Surrounding the spindle part 8 is a bushing 21 of some material such as cork or soft rubber. I also prefer to provide another bushing 22 around the upper part of the spindle to hold the central portion of the filter paper down against the gauze 11. The bushing 21 is adapted to fit snugly in the neck of a receptacle, such as a bottle 23. The liquid to be filtered enters the casing through one or more openings such as 24. In this case I have shown the liquid as being drawn from a receptacle 25 by means of a tube 26 connected to the inlet 24.

Any suitable form of suction device may be employed, such for instance, as a hand pump having a barrel 27 adapted to be screwed into the collar 10. 28 is a handle for the suction rod 29 which carries the suction piston 30.

In the form of construction shown in Fig. 3, the valve 19' is located in the collar 10' instead of in the lower end of the spindle.

In this case the spindle part 8' is secured to the lower part of the filter casing and has a liquid passage 14' and an air passage 17'.

Although I have shown a simple form of hand suction pump directly attached to the filter casing, it should be understood that I consider suction might be applied in other ways within the scope of some of my claims. While I have shown the invention as applied to a device for transferring liquid from one receptacle to another on the same level, it should be understood that liquid might be allowed to flow by gravity into the filter casing, but that in either case, the rate of filtration may be greatly accelerated by applying suction in the receptacle to which the liquid is to flow.

I claim:

1. A filtering casing having a central spindle with an air outlet and a liquid inlet, a bushing on said spindle adapted to fit a bottle neck, the entrance to the air outlet being at a higher level than the exit of the liquid inlet so that inflowing liquid will avoid the outflowing air.

2. In a filter, a casing formed in two parts with a central spindle having an air outlet and a liquid inlet, and a filtering gauze resting on the bottom of the casing surrounding the spindle, said casing having a liquid inlet.

3. In a filter, a casing having a detachable upper portion and a central spindle, a filtering gauze removably mounted in and supported by the bottom of the casing, filter paper on the gauze, and two yielding members to clamp the paper around the spindle and at an edge of the casing.

4. In a filter, a casing having upper and lower members and a central spindle, a filtering gauze surrounding the spindle and supported at all points by the lower member, and a variably compressible removable sleeve on said spindle for holding said gauze in place.

5. In a filter, a casing having a liquid inlet, a spindle for said casing having an air outlet, and a liquid inlet extending from inside of said casing to the lower end of said spindle, and a closure member surrounding said spindle below said casing above said liquid outlet and said air inlet and adapted to fit in the neck of a bottle and to be quickly removed therefrom.

6. In a filter, a casing formed in two parts, a gauze and filtering medium clamped therebetween and supported throughout by one part of the casing, and a spindle connected to said casing having an air valve, and provided at one end with means to tightly fit a bottle neck and instantly withdrawable therefrom.

7. In a filter, a casing for the liquid to be filtered, a spindle connected to said casing having an air inlet and a liquid outlet, means connected to said spindle for removing the air through said spindle, and means on said spindle adapted to support the entire filter on the neck of a bottle.

8. In a filter a lower casing part, a spindle carried thereby and having an air outlet and a liquid outlet, a gauze detachably mounted on the spindle, a filtering disc on the gauze, a yielding bushing on the spindle to hold the disc and gauze in place, and an upper casing member detachably secured to the spindle and clamping said bushing, disc and gauze in place.

9. In a filter, a casing including a lower part and an upper part, both having central apertures, a spindle extending through said apertures and containing liquid and air outlets, a gauze wholly in contact with and supported by said lower part, a filtering disc covering and supported by said gauze, a gasket at the outer periphery of the filtering disc held in place by pressure of the upper part of the casing, a removable bushing on the spindle to clamp the inner margin of the filtering disc and gauze to the lower part of the casing, and means for holding the upper part of the casing on the spindle.

10. A vacuum filter comprising a spindle formed in two parts, one part having a suction passage and the other part having a suction passage and a liquid inflow passage, a valve in the suction passage of the latter part, a two-part casing mounted on said spindle, a filtering gauze in the botttom of the lower part of the casing adapted to support a filter paper, a gasket between the outer edges of the parts of said casing, a yielding member on the spindle between the parts of said casing for holding said gauze in place, and means for clamping said casing and said yielding member on said spindle.

11. A vacuum filter comprising a spindle having a suction passage and having a liquid inlet passage, a casing mounted on said spindle, a liquid inlet passage communicating with the interior of said casing and discharging at one end of the spindle, a suction passage in the spindle extending through the other end of the spindle, said casing having a liquid inlet, and a filter supporting gauze resting in the bottom of the casing.

12. A vacuum filter comprising a spindle having a suction passage opening at the upper end and having a ball valve in said passage, a casing supported on said spindle and having a liquid inlet in one wall thereof, said spindle having a liquid inlet passage communicating with the interior of said casing and extending to the lower end of said spindle.

13. A filter comprising a spindle formed of two parts detachably secured together and having a suction passage extending from its upper end to a point near its lower end, a check valve mounted in said passage, a casing mounted on said spindle and a collar for clamping said casing on said spindle, said casing having a liquid inlet in one wall thereof.

14. A vacuum filter comprising a two-part spindle having a suction opening extending from the upper end to a point near the lower end, a casing consisting of an upper and lower part mounted on said spindle, said lower part of said casing being clamped between the parts of said spindle and said spindle having a liquid passage extending from within the casing to the lower end of the spindle, said casing having a liquid inlet in one wall thereof.

SAMUEL ALSOP.